May 13, 1924.

H. N. FOCHS

MOTOR CONTROLLER

Filed Oct. 23, 1922

1,494,230

WITNESSES
W. Y. Jones
R. D. Hulsizer

INVENTOR
HERBERT N. FOCHS
BY Munn & Co
ATTORNEYS

Patented May 13, 1924.

1,494,230

UNITED STATES PATENT OFFICE.

HERBERT N. FOCHS, OF NEW YORK, N. Y.

MOTOR CONTROLLER.

Application filed October 23, 1922. Serial No. 596,229.

*To all whom it may concern:*

Be it known that I, HERBERT N. FOCHS, a citizen of the United States, and a resident of the city of New York, borough of Manhattan, in the county of Manhattan and State of New York, have invented a new and Improved Motor Controller, of which the following is a full, clear, and exact description.

This invention relates to a motor controller and has for an object a provision of a circuit and apparatus whereby the direction of motion of a motor may be simply and easily reversed by means of a controller in which only two wires are required to extend between the source of power and the controller and the motor.

A further object resides in the provision of means whereby the manipulations required to operate the device is reduced to a minimum and whereby the current consumption entailed by the operation of this device is only very slightly above the normal operating current for the motor when running in either direction.

A still further object resides in the particular construction and arrangement of parts hereinafter described and claimed and shown in the accompanying drawing.

In general the invention comprises a combination of a motor with its field winding and reversing switch, a magnet for operating the switch, a resistance rheostat and circuit connections between these various devices whereby the simple manipulation of the controller handle in one direction or another will result in the closing of the circuit and the operation of the motor into the desired direction.

The invention is illustrated in the drawings of which—

Figure 1:
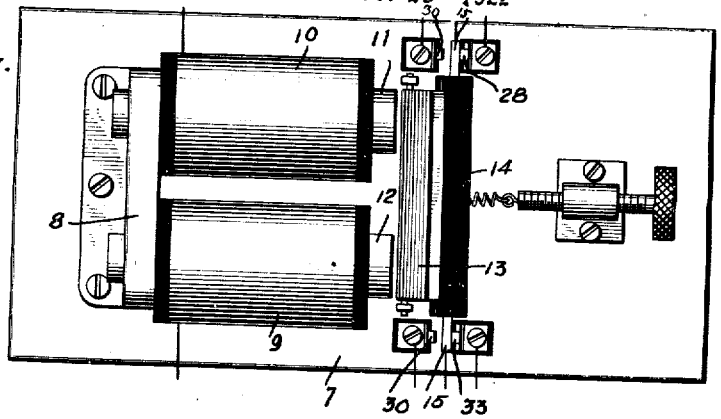
Figure 1 is a plan view of the operating magnet and reversing switch.

As shown in the drawings, the preferred form of my invention comprises the use of an electromagnet 1, reversing switch 2, a motor 3, having a field winding 4 and a suitable rheostat resistance 5, with an operating arm 6, capable of being moved in either direction.

Figure 2:
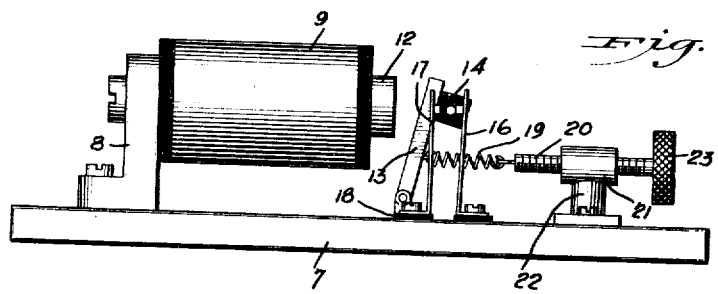
Figure 2 is a side elevation of the same.

As shown in Figures 1 and 2 the apparatus including the operating magnet and reversing switch, comprises a suitable base 7, preferably the insulating material. On this base is fastened a suitable bracket 8 to which a pair of magnet coils 9 and 10 are connected. Adjacent the poles 11 and 12 of these coils an armature plate 13 is suitably pivoted to the base portion 7. On its rear upper face this armature carries an insulating bar 14, from the ends of which project contacting studs such as 15. Each of these studs are adapted in accordance with the movement of the armature to move back and forth between two spring contact blades, such as 16 and 17. These blades are suitably connected to the base 7 and are spaced therefrom electrically by means of insulating plate 18.

Figure 3:
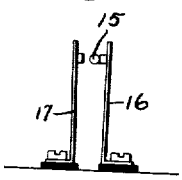
Figure 3 is a detailed illustration of one position of the switch contact, preferably the normal position.
Figure 4:
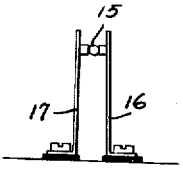
Figure 4 is an illustration of the position of the switch contacts when the switch is midway in its movement from one position to another.
Figure 5:
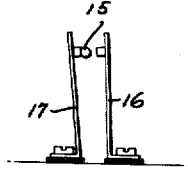
Figure 5 is an illustration of the position of the switch contacts when the switch is in an abnormal position.

The normal retracted position of the armature as shown in Figures 1 and 2 is such that the studs 15 bear against their back contacts as shown particularly in Figure 3. This retracted position is maintained by reason of a connection with the rear of the armature of spring 19 connected to an adjustable shaft 20 threaded in a suitable bearing 21 on a pedestal 22 mounted on the base 7. This shaft can be manipulated by means of thumb nut 23.

The spring blades 16 and 17 are so positioned and adjusted that as the studs 15 move to the left, contact is made by the studs with the blade 17, before the contact with the blades 16 have been broken. As will be readily seen hereinafter, this short circuits the motor temporarily to prevent undue sparking and conductive discharges.

Figure 6:
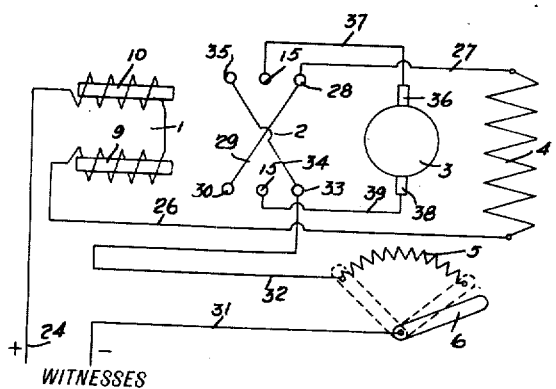
Figure 6 is a diagrammatic representation of the circuit arrangement involved in the use of this system.

Referring to Figure 6, which represents the circuit involved in this system, a wire 24 leads from the plus side of the source of power to the coil 10 and thence to the coil 9.

A wire 26 extends from the coil 9 to one end of the field winding 4. From there a wire 27 extends to a contact 28 of the reversing switch. This contact is connected by a wire 29 to a front contact 30. The minus side of the source of power is connected by a wire 31 to a controller arm 6. This arm is adapted to be moved in either direction. If moved in counter-clockwise direction from the full line position shown in Figure 6, this arm is adapted to contact with the right hand end of resistance 5. If it swings in a clockwise direction from the full line position the arm 6 closes the circuit 1 at the left hand end of the resistance 5. In this second movement, therefore, the circuit is closed with the resistance out of circuit, whereas in the other direction of movement the circuit is first closed with all the resistance 5 in circuit 3. A wire 32 extends from the left hand of resistance 5 to a rear contact 33 on the reversing switch. A wire 34 connects this contact with a front contact 35. The upper brush 36 of the motor 3, as viewed in Figure 6, is connected by a wire 37 to one of the studs 15, whereas the other brush 38 of the motor 3 is connected by a wire 39 to the other contact stud 15.

Figure 7:
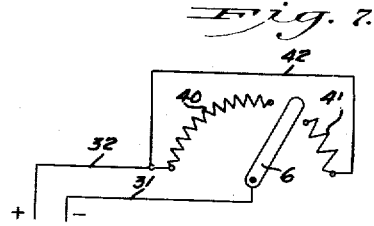
Figure 7 is a detailed view of a modified circuit.

In Figure 7 the wires 32 and 31, leading to the resistance controller are shown together with the arm 6. In this modification, however, two resistances are used, one resistance 40 and the other 41, each having a different predetermined view. The normal position of the switch arm is intermediate these resistances. The right hand end of the resistance 41 is connected to the left hand end of resistance 40 by means of a wire 42.

In the operation of the device we will first assume that the controller 6 is in the position shown in full lines in Figure 6. Assuming that it is moved then in a counter-clockwise direction, it first contacts and makes a circuit with the entire resistance in the circuit. This causes the current to flow through the magnet, the reversing switch and the motor with its winding, with the switch in its retracted position. The view of the resistance 5 figured with respect to the other resistance in the circuit is such that the current thus produced is insufficient to energize the magnet strongly enough to throw the switch and therefore the armature remains on the back contacts and the motor, for example, will move in a reverse direction if the switch is allowed to remain in this position.

When, however, the switch is moved from the normal position in a clockwise direction the circuit is first made at the left hand end of the resistance 5, in which position the entire resistance 5 is out of circuit. This causes a starting current of a slightly greater value to be applied. The design of the apparatus and resistances included in the circuit are such that this starting current is sufficient to energize the magnet strongly enough to pull over the armature and cause the studs 15 to contact with their front contacts 35 and 30. A consideration of Figure 6 will disclose that this movement of the armature reverses the direction of flow of the current through the armature of the motor, whereby the motor will then move in the opposite direction. After the motor is started the rheostat arm 6 can be moved to the right hand end of the resistance 5 since after the armature 13 is moved over adjacent the poles 11 and 12 of the magnet it requires very little current to keep it over in this position.

The value of the resistance 5 and the sensitiveness of the adjustment of the spring 19 can be so predetermined that it requires only a very small amount of current above normal to flow through the magnet and cause the operation of the switch. It will be observed that from the magnet and the rheostat only two wires extend to the motor. It will also be observed that from the rheostat and the source of power only two wires extend to the magnet and the switch so that the rheostat may be located at any distance from the motor and requires only the use of a minimum amount of wire to lead therebetween. It will also be perceived that the magnet, the field winding, motor armature and the rheostat are all in series through the reversing switch, an arrangement which requires a minimum amount of conductor wire.

What I claim is:—

1. A motor controlling system which comprises a motor and reversing switch, a magnet for operating said switch, a rheostat and connections therebetween, said rheostat and said connections being adapted to operate the switch and connect the motor for operation in one direction or another upon the movement of the rheostat arm in one direction or another to close the circuit at either end of the rheostat resistance.

2. A motor controlling circuit and apparatus, which comprises a reversing-switch-operating magnet, motor field windings and a reversing switch, a motor armature, a rheostat resistance, and a rheostat arm, all disposed in series.

3. A motor controlling circuit and apparatus which comprises a reversing switch, a magnet for operating said switch, a motor field winding and motor armature, a rheostat resistance, a rheostat arm, all disposed in series, and a source of power, connections from the source of power to said apparatus, the said rheostat resistance being of such value that when the rheostat arm closes the circuit at one end of the resistance the current flowing in the circuit will be insufficient to operate the reversing switch whereas when the rheostat arm closes the circuit at the other end of the resistance, starting current is sufficient to energize the magnet strongly enough to throw the reversing switch.

4. A motor controlling apparatus and circuit which comprises a reversing-switch-operating magnet, a motor and a field winding and reversing switch and a rheostat, all connected in series, a source of power, a single wire leading from the source of power to one side of the magnet and a single wire leading from the source of power to the arm of the rheostat.

HERBERT N. FOCHS.